United States Patent [19]

Balopole et al.

[11] Patent Number: 4,839,726
[45] Date of Patent: Jun. 13, 1989

[54] VIDEO ENHANCEMENT METHOD AND SYSTEM

[75] Inventors: Harvey L. Balopole, Little Neck; James J. Martinolich, Seaford; Arthur Roberts, Fresh Meadows; Henry W. Sadowski, Plainview, all of N.Y.

[73] Assignee: Fairchild Weston Systems, Inc., Syosset, N.Y.

[21] Appl. No.: 80,272

[22] Filed: Jul. 31, 1987

[51] Int. Cl.$^4$ .................. H04N 5/14; H04N 5/57
[52] U.S. Cl. ......................... 358/166; 358/169; 358/160
[58] Field of Search ............... 358/166, 160, 167, 169, 358/35, 37, 36

[56] References Cited

U.S. PATENT DOCUMENTS

| | | | |
|---|---|---|---|
| 4,096,516 | 6/1978 | Pritchard | 358/37 |
| 4,231,065 | 10/1980 | Fitch | 358/166 |
| 4,364,092 | 12/1982 | Holmes | 358/167 |
| 4,399,461 | 8/1983 | Powell | 358/166 |
| 4,443,855 | 4/1984 | Bishop | 358/166 |
| 4,538,179 | 8/1985 | Tsutomu et al. | 358/166 |
| 4,559,560 | 12/1985 | Murata | 358/167 |
| 4,568,977 | 2/1986 | Chamberlain | 358/166 |
| 4,570,193 | 2/1986 | Yamashita | 358/166 |

OTHER PUBLICATIONS

Weinstein, "Analog Video Image-Enhancing Device," (May/Jun. 1986) *Nasa Tech Briefs*, p. 46.
Vermeiren et al., "Novel CCD Output Structure for Picture Processing Applications," (May 20–23 1985) *IEEE Proc. Cust. IC Conference*, pp. 128–131.
Beedie, "Image IC Detects Edges in Realtime," (May 15, 1986) *Electronic Design*, pp. 57–58.
Dawson, "Image Filtering for Edge Enhancement," (Feb. 1986) *Photonics Spectra*, pp. 93–98.
"Matsushita Claims Fastest Image Processor Chip," (date unknown) *E. E. Times*, p. 53.
"Best of 1986; Image IC Detects Edges in Real Time," (date and origin unknown).
"Topics in Applied Physics," vol. 6, *Picture Processing and Digital Filtering*, Editor T. S. Huang (1975), pp. 1–20.

*Primary Examiner*—Tommy P. Chin
*Attorney, Agent, or Firm*—Asman, S. J.

[57] ABSTRACT

On-the-fly video processing to implement two-dimensional algorithms is performed without a frame buffer or random-access memory, by using CCD delay elements whose clock rate is controlled by a phase synchronizing loop, to achieve precise vertical alignment of pixels where the chosen algorithm requires.

25 Claims, 4 Drawing Sheets

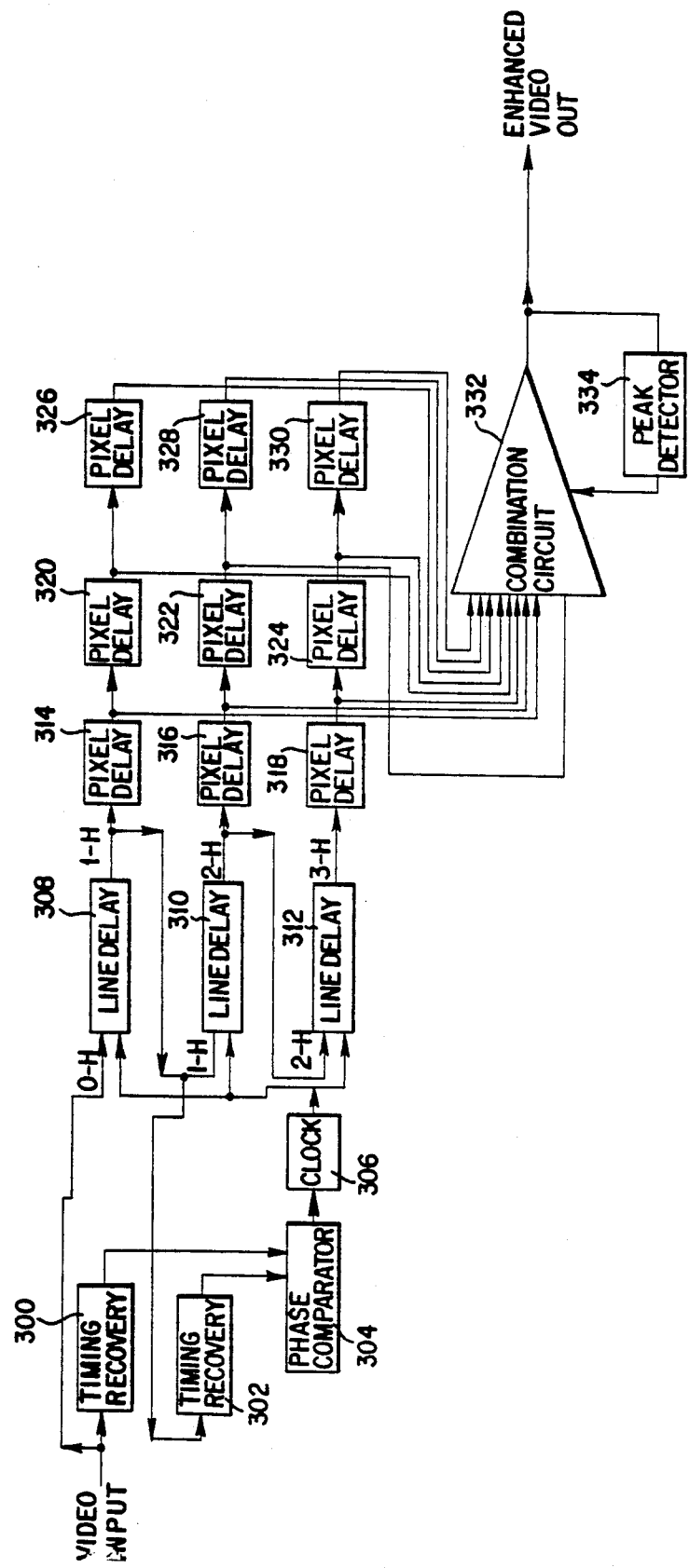

FIG.4a  VIDEO INPUT 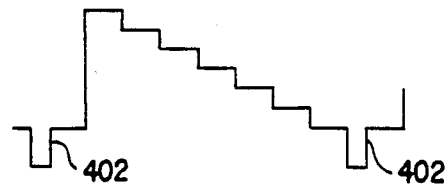
FIG.4b  BACKGROUND VIDEO 
FIG.4c  DETAIL 
FIG.4d  ENHANCED VIDEO 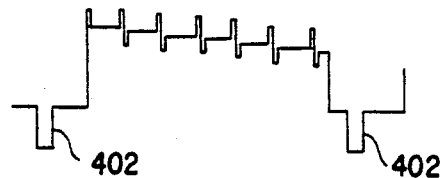

VIDEO ENHANCEMENT METHOD AND SYSTEM

BACKGROUND OF THE INVENTION

1. Field of the Invention

The invention relates to systems which perform image processing, and more specifically to systems which perform two-dimensional image enhancement algorithms.

2. Discussion of Related Art

Various known teachings which are believed to be related to various ones of the innovations disclosed in the present application will now be discussed. However, applicants specifically note that not every idea discussed in this section is necessarily prior art. For example, the characterizations of the particular patents and publications discussed may relate them to inventive concepts in a way which is itself based on knowledge of some of the inventive concepts. Moreover, the following discussion attempts to fairly present various suggested technical alternatives (to the best of applicants' knowledge), even though the teachings of some of those technical alternatives may not be "prior art" under the patent laws of the United States or of other countries. Similarly, the Summary of the Invention section of the present application may contain some discussion of prior art teachings, interspersed with discussion of generally applicable innovative teachings and/or specific discussion of the best mode as presently contemplated, and applicants specifically note that statements made in the Summary section do not necessarily delimit the various inventions claimed in the present application or in related applications.

A video signal may consist of a series of two-dimensional images ("frames") which are transmitted in rapid succession. A human observer seeing the rapid succession of frames will get the impression of a continuous picture which may include motion.

Each frame may be described as a grid of minimum-dimension picture elements (or "pixels") of varying intensities. That is, the dimensions of the pixels are defined to be at least as small as the maximum resolution of the image, so that the image may be represented by transmitting very simple set of scalar parameters (e.g. grey-scale and color information) for each pixel.

The video signal is normally transmitted by encoding pixel parameters sequentially on an electronic waveform. In the most common versions of this, the pixels will be transmitted in a pixel-by-pixel, serial fashion which corresponds to transmitting one horizontal line of pixels (e.g. from left to right) at a time. The horizontal lines are also sequentially transmitted (e.g., from top to bottom) in groups which correspond to fields. This technique is commonly called raster scanning.

The serial waveform thus transmitted can be converted into a two-dimensional picture by a monitoring device such as a television picture tube (cathode ray tube), wherein the serial sequencing used to transmit the pixels is reproduced as a sequence of setting pixel brightness values (e.g. by steering an electron beam across a display phosphor).

Interlaced scanning is a very common variation of the raster scanning technique. Interlaced scanning involves the "interlacing" of the horizontal lines. Alternate lines are transmitted as a complete field, and the next field contains the lines not transmitted in the previous field. In other words, the first field contains the odd numbered lines and the second field contains the even numbered lines. Thus, two consecutive fields comprise a complete frame. This technique is used to reduce the transmission bandwidth of the video signal.

There are many different configurations and variations of raster scanning. The NTSC standard currently in use in the United States provides 525 horizontal lines per frame and a maximum of 525 pixels per horizontal line, and transmits each horizontal line in 63.5 microseconds. Other standards are currently in use throughout the world. These other standards, such as CCIR, PAL, or SECAM, may have different transmission times, maximum number of pixels per line, and number of lines per frame. Many factors (in addition to compatibility with available signal sources) can be considered when choosing a transmission standard, such as the desired resolution or sharpness of the picture, the reduction of "flicker" (the human observer's residual perception of the image refresh interval corresponding to frame-by-frame or field-by-field transmission), etc. Some proposed high-definition video standards would (in effect) encode the video information as two parallel serial streams, to preserve downward standards compatibility.

The electronic waveform also contains various timing signals transmitted between the horizontal lines and frames, such as horizontal line synchronization, frame synchronization, and the blanking interval, which are utilized to assure accurate reproduction of the video picture from the electronic waveform. This timing information is generally included on the waveform as pulses interspersed between various sections of modulated pixel information.

Many image processing techniques which have been proposed or are currently in use involve modifying the value of a pixel of a video image with reference to the values of neighboring pixels, and producing a new or better image based on this comparison. These techniques have been suggested for noise reduction generally, and for specific applications such as target or object identification, low light surveillance, or the improvement of hazy or unsharp images. Also, these techniques have been suggested in combination with known image or object recognition methods or techniques.

The Laplacian algorithm, for example, is employed to enhance the detail of an image. The application of this algorithm involves averaging the intensities of a set of pixels which surround a certain pixel of interest, and subtracting some fraction of the average value of intensity from the intensity of the pixel of interest. This difference is then substituted for the intensity of the pixel of interest.

Some description of current picture processing and filtering techniques is found in *Topics in Applied Physics—Picture Processing and Digital Filtering*, Volume 6 edited by T. S. Huang, which is incorporated herein by reference.

The comparison of pixel values can be done digitally. For example, the value of each pixel could be measured, and the value placed in a Random Access Memory (RAM) device. The pixel values could then be selectively recalled from the RAM device, to be compared with neighboring pixels and modified accordingly, using digital arithmetic operations in a digital processing device. With the great versatility of the currently available digital processing devices, a very wide range of algorithms may be implemented using these techniques.

Unfortunately, the speed of the digital processing devices in the current technology is insufficient to allow real-time video processing for many applications without considerable difficulty and/or cost. In many instances, it is desirable to be able to process or improve a video image in real time. Also, since the pixel information is usually in analog form, the digital implementation of these suggested algorithms will, of course, require additional hardware for analog to digital and digital to analog conversion at video rates.

It has been proposed that satisfactory results could be achieved by using analog techniques to process video images in real time, if a two-dimensional array of pixels could be produced from the video signal. These analog techniques would involve electrically combining spatially related pixel values (e.g. using resistor networks and/or op amps) to implement a desired transform operation on each pixel, and thus produce the new image.

Such analog techniques require the simultaneous availability of the pixel values which are to be combined. However, no random-access structure organization for storing analog signals at video data rates is readily available. Therefore, real-time comparison of horizontally or vertically related pixels in a raster-scanned video input signal requires the use of serial access memory devices or signal delay devices.

Signal delay devices produce an output signal which is a time-delayed version of the input signal. If a video signal is being input to a signal delay device, the spatial relationship between the pixel being input to the delay device and the pixel simultaneously being output by the delay device is determined by the amount of time delay introduced by the delay device.

The amounts of delay time commonly utilized in image processing circuitry are individual pixel delays, horizontal line delays, and field delays. Recalling the previously mentioned raster scanning method, for example, an individual pixel delay device will output the pixel to the immediate left of the input pixel; a horizontal line delay will output the pixel vertically above the input pixel; and the field delay device will output a pixel which has almost the same horizontal and vertical position as the current input pixel, but which is displaced from it by one line in an interlaced display. (In a non-interlaced display, the output pixel will correspond to the pixel component of the previous field which has the same (x,y) coordinates as the current pixel.)

It can be seen that the combination of the various types of delays may be used to simultaneously make available a desired set of pixel values with a desired spatial relationship for analog real-time processing. The set of pixels commonly may be a 3-by-3 or 5-by-5 grid, a horizontal or vertical rectangle, or generally may be any set of pixels one may envision.

In an iterated procedure, this set of pixels "travels" through the raster-scanned image. In the particular combination which produces a 3-by-3 grid of pixels, for example, this traveling grid begins in the upper left corner of the field and travels line by line until reaching the lower right corner of the field. Conventional high-speed operational amplifiers, for example, may then be used to weight and sum the pixel values produced by the delay devices.

These analog processing techniques have the potential to be realized in real time, subject to the limitation, of course, that it will not be possible to output a pixel from the image processing circuits until all pixels upon which the output pixel depends have been input.

A great deal of work has been invested in the art into defining various video transforms based on sequential manipulations of small blocks of pixels, e.g., 3 by 3 blocks of pixels. As recognized in the previous literature of this kind, not only can different-shaped blocks of pixels be used as the input to the sequentially iterated state of a transformed algorithm, but the blocks themselves do not have to be solid blocks of pixels. That is, one option is to use a sparse grid of pixels (e.g., a small checkerboard-type pattern) to provide the input values for the local transformation of each pixel value. Similarly, not all of the pixels whose values are input into the transformation algorithm need be weighted the same. One advantage of analog methods, such as those enabled by the present invention, is that analog weighting can be easily used, simply by specifying ratios between resistors (and/or between capacitors). Thus, while the principally preferred best mode (as extensively discussed below) uses the Laplacian transform algorithm, a tremendous variety of other transform algorithms could be used.

An example of a device which embodies several of the previously discussed concepts is disclosed in U.S. Pat. No. 4,399,461 to Powell. The Powell patent discloses the use of field delays, line delays, and pixel delays to produce a plurality of signals representative of pixels in the video image. Various video processing techniques may then be employed by multiplying and summing these signals. The Powell patent specifically discloses image enhancement by improving contrast in vertical, horizontal, or diagonal directions.

A general description of the various video processing algorithms which may be accomplished by a device such as is disclosed in the Powell patent may be found in an article by Benjamin M. Dawson entitled, "Technology Trends—Image Filtering for Edge Enhancement," published in *Photonics Spectra,* February, 1986. Discussed therein are video processing techniques such as edge enhancement, shift-and-difference, gradient, and Laplacian transform.

The use of signal delay devices to keep a running sum of the serially input pixel values has been suggested. U.S. Pat. No. 4,231,065 to Fitch et al. discloses the use of recursive filters to process a video signal. The algorithm employed therein causes a moving average of the intensity to be subtracted from the input signal to produce a new signal containing enhanced local variations of the original signal.

The use of a CCD shift register as a signal delay device in a video processing circuit is disclosed in U.S. Pat. No. 4,568,977 to Chamberlain et al. In the Chamberlain patent, the Laplacian image enhancement algorithm is performed on the input signal. Line delays and pixel delays are realized by a single, very long shift register. The multiplication and addition functions of the Laplacian algorithm are performed on the same chip which contains the CCD shift register.

In U.S. Pat. No. 4,096,516 to Pritchard, the chrominance and luminance components of a standard color television signal are separated using several one line delay devices. The delay time of the line delay devices is controlled by a clock signal. The clock signal is generated by a frequency multiplier and is based on the frequency of the incoming chrominance signal.

SUMMARY OF THE INVENTION

In this section various ones of the innovative teachings presented in the present application will be discussed, and some of their respective advantages described. Of course, not all of the discussions in this section define necessary features of the invention (or inventions), for at least the following reasons: (1) various parts of the following discussion will relate to some (but not all) classes of novel embodiments disclosed; (2) various parts of the following discussion will relate to innovative teachings disclosed but not claimed in this specific application as filed; (3) various parts of the following discussion will relate specifically to the "best mode contemplated by the inventor of carrying out his invention" (as expressly required by the patent laws of the United States), and will therefore discuss features which are particularly related to this subclass of embodiments, and are not necessary parts of the claimed invention; and (4) the following discussion is generally quite heuristic, and therefore focusses on particular points without explicitly distinguishing between the features and advantages of particular subclasses of embodiments and those inherent in the invention generally.

The present invention provides several advantages and improvements over the devices and concepts known in the art.

A basic problem faced in analog video processing circuits is the conversion of the raster-scanned (serially transmitted) video signal into a two-dimensional array of simultaneously available pixel values. The simultaneous availability of pixel values is necessary to allow the use of analog techniques in the combination of the pixel values. The present invention produces a two-dimensional array of simultaneously available values of spatially related pixel locations by utilizing a combination of line-delay devices and pixel-delay devices. The various signal delay devices utilized by the present invention may be connected in a variety of configurations. It should be understood that a desired set of pixel values may be produced by any of several signal delay device configurations. The present invention can be used with a variety of analog techniques for combining the set of simultaneously available pixel values.

It is desirable to have a video processing device which is versatile and may be used with a wide variety of video signal formats, such as NTSC, CCIR, and others previously discussed, and a wide variety of signal sources, such as video cameras, video tape recorders, signal generators, et cetera.

A problem with the implementation of such a versatile video processor lies in assuring accurate synchronization of the processing circuitry with the incoming video signal. As previously discussed, video signals usually contain synchronization information which is designed to follow one of many standard timing and configuration formats. In raster-scanning systems, this information includes horizontal line and field synchronization pulses modulated onto the video waveform. In actual practice, however, the synchronization information may vary slightly from source to source, or even from line to line in sources such as video tape recorders, and thereby cause errors in the processing of the video signal.

The present invention solves these problems by automatically adjusting the line delays to match the incoming video signal.

In some of the processing algorithms envisioned for use with this invention, vertical pixel alignment is critical to maximizing the performance of the processing algorithm. For example, if the enhancement algorithm to be implemented requires the comparison of the pixel of interest with another vertically adjacent pixel, the processing hardware should reliably produce that vertically adjacent pixel for each pixel of interest within the field. Therefore, the invention ensures that the line delay devices precisely delay the incoming video signal to match the synchronization pulses of the incoming signal. This is accomplished by sensing the video signal before and after passing through the line delay device and adjusting the delay time of the line delay device to cause the input and output signals of the line delay device to differ by exactly one horizontal line. This assures precise vertical alignment of the pixels in the signal input to the line delay device and the signal output from the line delay device.

In the preferred embodiment, the line-delay devices are charge coupled device (CCD) delay devices. Less preferably, any analog signal delay device in which the amount of delay may be adjusted can be used. The delay time of the CCD delay device may be adjusted by varying the frequency of the clocking signals which are input to the CCD delay device. The horizontal synchronization pulses are sensed before and after passing through the line-delay device, and their relative phase compared to create an error signal which is used to adjust the delay of the line-delay devices.

Therefore, utilizing the above-described concepts, the invention produces a plurality of video signals which are precisely delayed by one horizontal line. In the preferred embodiment, two line delay devices are connected in a serial configuration. The first line delay device's output is a first delay signal which is precisely delayed one horizontal line from the input video signal. This first signal is then input into the second line delay device to produce a second delay signal which is precisely delayed two horizontal lines from the input signal.

These three signals (the input signal, the first delay signal, and the second delay signal) are then passed through a plurality of pixel delay devices. In the preferred embodiment, two pixel delay elements are utilized to produce a first delayed pixel to the immediate left of the input pixel, and a second delayed pixel to the immediate left of the first delayed pixel. In the preferred embodiment, inductance-capacitance devices are used to provide the pixel delays, but any convenient device which produces a delay of suitable duration may be used.

With the two-dimensional array of pixels produced by the present invention, any of several common known processing algorithms may be employed. The preferred embodiment executes the Laplacian algorithm. As previously mentioned, this algorithm averages the pixel values of the eight pixels surrounding the center pixel in a 3 by 3 implementation. This average value is then subtracted from the center pixel value. This removes the background aspects of the video signal and enhances the local area variations or detail.

Another class of optional embodiments in the present invention combines advantageously with the hardware used for signal delays in the presently preferred embodiment, as discussed above. To simplify the hardware complexity, much of the previous discussion of video transform algorithms has focused on transformed algorithms which can be accomplished, pixel by pixel, by performing operations on pixels in a relatively small neighborhood of the individual pixel being transformed. (By repeating these sequential algorithms for each pixel, the whole image can be transformed according to one of the available two-dimensional transform algorithms.) However, one limitation of the relatively small neighborhoods preferably used in such transforms is that these transforms are most advantageous with the high-spatial-frequency information. Thus, while these algorithms can be quite useful for edge enhancement and similar feature extraction, they will not necessarily enhance the larger-dimension features which can be very useful in subsequent operations, including image recognition by human observers. Moreover, if the enhancements of the high-spatial-frequency information are pushed aggressively, they can actually detract from the overall intelligibility of the image. For example, in the Laplacian algorithm discussed above, the weighting of the average value which is subtracted from the center pixel can be adjusted according to the degree of enhancement which is desired. However, if the weighting were selected to be a very high value, the overall intelligibility of the scene could be degraded, since all large areas will be transformed into approximately the same luminance value, regardless of the respective luminance values which those large areas originally had.

Thus, one class of optional embodiments of the present invention produces a signal corresponding to the enhanced information and another signal corresponding to a reduced contrast version of the input video signal. This means that the enhancement algorithm can be run at relatively high gain, so that the detail features are enhanced as much as possible, without degrading the larger-scale features due to the algorithm operation. A subsequent recombination step mixes the enhanced information back into the reduced contrast original information, to provide an enhanced overall image. Thus, this class of embodiments of the present invention provides further advantages in the enhancement of the output signal and the intelligibility of the corresponding video display to human observers, and also provides additional flexibility in partitioning the video transform algorithm. The separation of enhanced information from background information, so that signal amplification can be performed separately on the enhanced information, has been suggested in the prior art; but the combination of this architecture with the features of the present invention provides particular advantages.

Also, the timing information may be split from the incoming video signal and recombined after the desired processing has been done. Alternatively, the timing information may be separately generated and combined with the processed signal.

BRIEF DESCRIPTION OF THE DRAWINGS

FIG. 3 shows yet another embodiment in which a 3×3 grid of pixels is produced by utilizing 3 line delay devices and 9 pixel delay devices.

FIGS. 4a, 4b, 4c, and 4d show intermediate signals at various stages of processing by the present invention.

DESCRIPTION OF THE PREFERRED EMBODIMENTS

The preferred embodiment of the present invention implements the Laplacian enhancement algorithm on a 3×3 grid of pixels. The Laplacian enhancement algorithm, previously described herein, is an algorithm which enhances the high spatial frequency or "detail" information of a video signal. In other words, it enhances high gradient or small-dimension features of a video picture, and attenuates the low gradient or large-dimension features, i.e., "background" of the video picture.

The present invention employs various signal delay devices to convert the serially transmitted information of the video signal into a (preferably small) two dimensional array of pixels. The signal delay devices comprise line delay devices and pixel delay devices. The use of field delays in the preferred embodiment is not shown, although it may less preferably be used in other embodiments.

Figure 1:
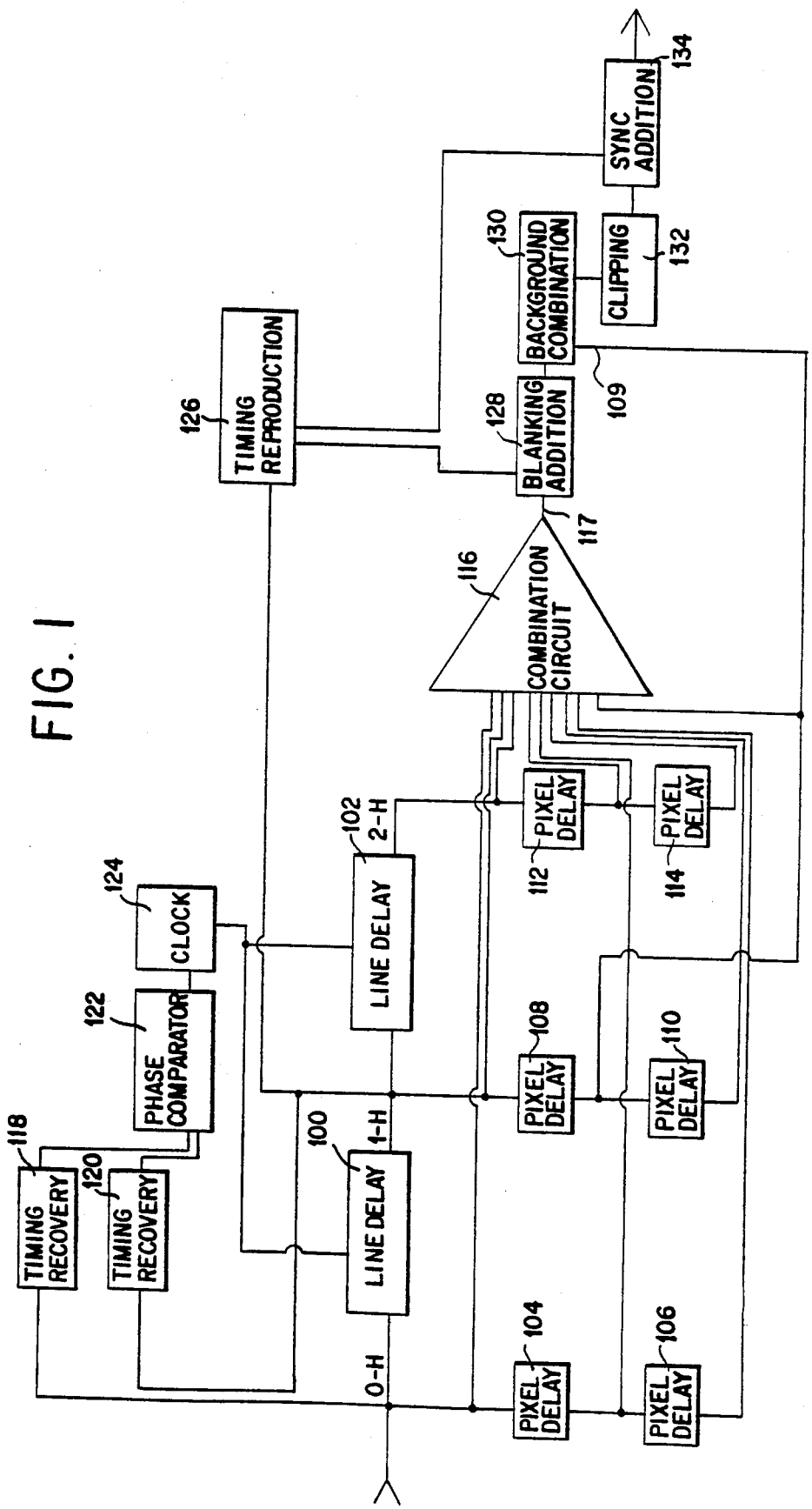
FIG. 1 shows a block diagram of a preferred embodiment which implements the Laplacian algorithm on a 3×3 grid of pixels and introduces a background portion of the original signal to the enhanced signal.

Referring now to FIG. 1, the line delay devices, 100 and 102, are preferably of the charge coupled device (CCD) type. Less preferably, the line delay devices can be other types of charge transfer device (CTD) type, although any signal delay device which will achieve a horizontal line delay and whose delay time is electronically adjustable may be considered. The pixel delay devices, 104, 106, 108, 110, 112, and 114, are preferably of the tapped inductance-capacitance type (which are available as standard parts in standard DIP packages to provide delays of (e.g.) 100 nsec or more). Less preferably, the pixel delay devices may be any type device which will result in a one pixel delay.

The input signal is applied to the first line delay device 100 and to the first pixel delay device 104. The input to the first line delay device 100 is commonly known as a 0-H video signal and the output is commonly known as a 1-H video signal. The 1-H video signal is input to second line delay device 102. The output of the second line delay device 102 is commonly known as a 2-H video signal. The 0-H, 1-H, and 2-H video signals are then passed through the various pixel delay devices. It can be seen that this configuration will simultaneously produce nine signals which represent a 3×3 grid of pixels. In this fashion, the serial input information of the input video signal is transformed into a two dimensional array of pixels.

The combination circuit 116 may be a high speed general purpose operational amplifier. In the preferred embodiment, this combination circuit includes a plurality of resistors (not shown) used to weight the nine signals input to an operational amplifier (not shown). The combination circuit 116 is configured to average the values of the eight pixels surrounding the center pixel and to subtract this average value from the value of the center pixel. Notice that the center pixel is the one output from pixel delay device 108. Accordingly, the timing reproduction circuit 126 regenerates timing information in accordance with the 1-H signal, as will be discussed below.)

In the preferred embodiment, a variable resistor (not shown) is used in the circuit input of the center pixel produced from pixel delay device 108. This variable resistor may be utilized to adjust the weighting of the center pixel with respect to the average value of the eight surrounding pixels. It may be necessary to increase the weighting of the center pixel to retain a larger portion of the background information. This resistor's value may even be selected to implement a center pixel weighting which completely removes all background information.

Also provided in the preferred embodiment is an overall gain control (not shown) of the amplifier (not shown) in the combination circuit 116. The overall gain control adjusts the amplification of the difference between the center pixel value and the average of the eight surrounding pixel values. An increase in the overall gain will result in an increase in the amplitude of the signal shown in FIG. 4c. An increase in amplification may be desirable if, for example, there is a very small contrast between an object and its background.

The present invention may be utilized with video signals which incorporate the previously discussed interlaced scanning techniques. In the preferred embodiment, for example, the result of interlaced scanning will be that pixels with a vertical relationship will be those located in adjacent lines of a single field (and therefore these pixels will, in the full frame, be separated by an additional line from the other field.) This may result in slightly "thicker" horizontal lines in the processed video image, but in many cases this is satisfactory. It should be understood that this circuit may also process video signals which do not employ interlaced scanning techniques.

As previously described in the Summary of the Invention section, the present invention provides a versatile, self-adjusting video processor, which can adjust to a variety of input signals from a variety of sources. The applications envisioned for this invention include surveillance equipment, infrared video equipment, video tape recording equipment, military applications, or any application in which real-time video processing or enhancement is desirable.

The timing recovery devices 118 and 120, the phase comparator device 122, and the clock device 124 help provide this self-adjusting versatility. In the preferred embodiments, the timing recovery devices, 118 and 120, each comprise a "one-shot" circuit as is known in the art. This one-shot is triggered by the negative going synchronization pulse which is commonly employed in many video signals currently in use.

This one-shot eliminates the double frequency horizontal sync pulses which are present during the vertical blanking interval. This is accomplished by choosing the pulse width of the one-shot to be less than the time required to transmit one horizontal line and greater than one half of this time period.

As shown in FIG. 1, the 0-H input video signal is applied to the timing recovery device 118. The output from the first line delay device 100 (i.e. the 1-H video signal) is applied to the second timing recovery device 120.

The outputs from the timing recovery devices 118 and 120 are applied to the phase comparator 122. The phase comparator produces an error signal which is indicative of the difference in phase of the output from the timing recovery device 118 and the timing recovery device 120. In the preferred embodiment, an error voltage is created which is proportional to the time differential between the activation of the one-shot devices which comprise the timing recovery devices 118 and 120.

It is advantageous to take the input of the second timing recovery device 120 from the output of the first line delay device 100 (to minimize response time to a line time change), but alternatively a different delayed signal (e.g., the output of second line delay device 102) could be used instead.

The error voltage output from the phase comparator 122 is then applied to the clock 124. In the preferred embodiment, the clock 124 comprises a voltage controlled oscillator with an adjustable center frequency of 10.7 MHz. The 10.7 MHz center frequency is chosen to cause the line delay devices, 100 and 102, to provide an approximate one line delay for the preferred video standard in use (in this embodiment NTSC).

The output from the clock device 124 is then applied to clock the line delay devices 100 and 102. In the preferred embodiment, these line delay devices, 100 and 102, are charge coupled devices (e.g. Sony part number CXL 5001P) which require an input clocking signal. The particular specifications for this device require a 250 milliVolt (or more) peak to peak sine wave input. This particular device is specifically designed to provide a one-line delay for an NTSC input signal. The clocking signal is input at 10.7 MHz and the device stores 680 bits to produce the one-line delay. The input clocking signal determines the amount of delay provided by such a device. If the frequency of the input clocking signal is increased, for example, the delay time of such a device will be decreased, and vice versa.

As an illustration of the operation of this circuit, assume that the first line delay device 100 is providing a delay which is slightly greater than one horizontal line of the input video signal. Therefore, the timing recovery device 118 will be activated prior to the activation of the timing recovery device 120. The phase comparator 122 will therefore detect a difference in phase between the output of timing recovery device 118 and the output of timing recovery device 120. The phase comparator will generate an error signal which will be applied to the clock device 124, (a voltage controlled oscillator in the preferred embodiment). The clock device will then adjust its output to decrease the delay amount of the line delay devices 100 and 102. In the preferred embodiment, the error signal will cause the voltage controlled oscillator to increase in frequency (e.g., from 10.7 MHz) and therefore reduce the delay time of the CCD delay lines. It should be understood that if the line delay device 100 is producing a delay which is too short, the circuit will make a corresponding correction to increase the delay time of the line delay devices.

The timing reproduction device 126 produces signals which may be utilized to reintroduce the vertical blanking interval and the horizontal synchronization information into the processed signal. The 1-H video signal is taken from the output of the line delay device 100 and applied to the timing reproduction device 126. In the presently preferred embodiment, the timing reproduction device 126 produces clock signals which control the blanking addition circuit 128. The blanking addition circuit 128 may be, for example, a simple switching transistor which inserts the blanking interval.

The blanking addition circuit 128 also compensates for problems which may be created by the video processing algorithm at the edges of the two-dimensional field. In the preferred embodiment's execution of a 3×3 enhancement algorithm, a problem may be encountered when, for example, the first horizontal line is transmitted. An undesired output signal may result, in this instance, because there is not a horizontal line which is vertically adjacent to the first horizontal line. A similar problem is encountered at the vertical edges of the two-dimensional field. The blanking addition circuit 128 corrects this problem by placing a several line thick border around the complete two-dimensional field.

Another problem, as previously discussed herein, relates to the loss of the low-spatial-frequency information in a video processing circuit which employs an enhancement scheme such as the Laplacian algorithm. In general, high spatial frequency information relates to rapidly changing contrast values and low-spatial-frequency information relates to slowly changing contrast values. It is desirable to keep some of the low frequency information in the output signal, to facilitate the interpretation of the video picture by the human observer. Therefore, in one class of embodiments of the present invention, a signal containing the background information (e.g. a reduced contrast version of the input signal) is recombined with a signal which has been processed to enhance its detail information (e.g. the signal produced by the circuit implementing the Laplace algorithm).

In the presently preferred embodiment, to produce such a reduced contrast version of the input signal, the center pixel information (output from pixel delay device 108) is applied to a background combination circuit 130. The background combination circuit 130 reduces the contrast of the center pixel information and modulates this reduced contrast signal onto a constant, moderate gray level signal. This reduced contrast version of the input signal is then combined with the high-spatial-frequency information produced by the circuit which implements the Laplacian algorithm.

The clipping circuit 132 is used to prevent the video signal from exceeding preset positive and negative voltage limits. This is to prevent possible monitor saturation if the gain of the combination circuit 116 is excessive. The clipping circuit 132 also prevents the video signal from exceeding a preset negative voltage which may interfere with the addition of the sync information.

The sync addition circuit 134 is connected to the timing reproduction device 126. The sync addition circuit (when it receives a horizontal sync pulse from timing reproduction circuit 126) introduces a synchronization pulse which exceeds the negative excursion limit of the clipping circuit 132.

Referring now to FIG. 4, therein are shown typical signal configurations of the input signal at various stages of processing by the present invention.

FIG. 4a illustrates a representative input video signal. The negative going portion of the waveform relates to the horizontal synchronization pulses.

FIG. 4b shows a reduced contrast version of the input signal modulated onto a moderate gray level as may be found in the background combination circuit 130.

FIG. 4c shows a signal which is representative of the high frequency or detail information of the video input signal shown in FIG. 4a. (This example shows a case where equal weighting has been applied to the center pixel and to the average of surrounding pixels, so that all the background information has been removed.) Such a signal will typically be found at the output of the combination device 116.

FIG. 4d shows an enhanced version of the input video signal (shown in 4a), which will be produced at the output of sync addition circuit 134 by the combination of background information 109 (as shown in FIG. 4b), detail information 117 (as shown in FIG. 4c), and sync pulses 402 (re-inserted by sync addition circuit 134).

Figure 2:
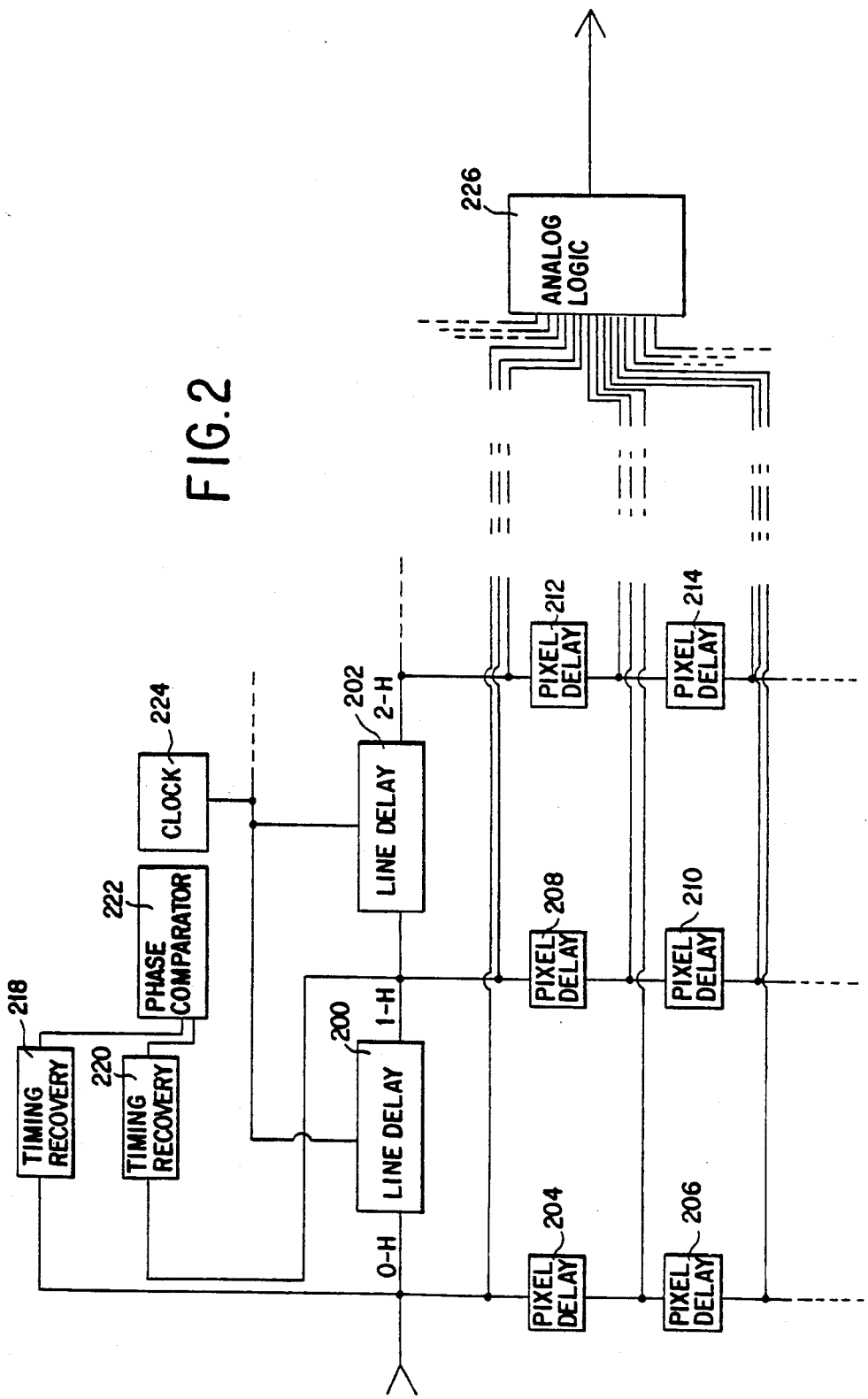
FIG. 2 shows a block diagram of another embodiment which may implement a variety of algorithms on a variable sized grid of pixels.

FIG. 2 shows another embodiment of the present invention. This embodiment is a more general version of the embodiment shown in FIG. 1, in that the embodiment shown in FIG. 2 may be utilized with a variety of enhancement algorithms performed on an arbitrary set of pixels. The line delay devices (200, 202, etc.), the pixel delay devices (204, 206, 208, 210, 212, 214, etc.), the timing recovery devices 218 and 220, the phase comparator 222, and the clock device 224 are similar in operation to those previously described.

The dashed lines indicate that an arbitrary number of line delay devices and pixel delay devices may be utilized to produce an arbitrary size (M×N) grid of pixels. (The dashed lines at the output signal from the clock device 224 are intended to indicate that this signal should be applied to each line delay device utilized.) It should be understood that the embodiment shown in FIG. 2 is but one example of the variety of configurations in which the signal delay devices may be connected.

A general analog logic circuit 226 is shown in FIG. 2, rather than the combination circuit 116 shown in FIG. 1. This is shown to indicate that a wide variety of analog combination operations can be performed on the signals which are provided from the various delay elements. Therefore, any combination of the arbitrary M×N grid of pixels may be achieved. Such combinations may involve, for example, reducing the weight of a pixel as its distance from the center pixel increases, or use of a sparse grid of pixels. Alternatively, elements could be swtiched in or out under external control, to change the combination operation performed.

Other implementation details such as the timing reproduction device, the blanking addition circuit, clipping circuit, the sync addition circuit, and the background combination circuit are not explicitly shown in FIG. 2, and may be, for example, similar to those shown in FIG. 1.

It is possible that the signal delay devices utilized in the present invention may unavoidably alter the incoming video signal. These alterations of the incoming video signal may include frequency roll off and signal attenuation. In this case, poor performance might result from combination operations (e.g., addition, multiplication, or subtraction) performed by the video processor. When, for example, in the execution of the video processing algorithm a non-delayed pixel (i.e., the input video signal) is combined with a delayed pixel (i.e., any pixel which has passed through a signal delay device). The delayed pixel will have been affected by the previously discussed alteration characteristics (or "transfer function") of the signal delay devices, and the undelayed pixel will not have been so affected. Therefore, in (for example) subtraction of these two signals, unwanted "noise" will result from the differences in these two signals caused by the transfer function of a delay device.

FIG. 3 shows yet another embodiment of the present invention, which passes each pixel value through at least one line delay device and at least one pixel delay device before producing a signal which is intended for combination, and thus advantageously avoids the problems which could be caused by the transfer function.

In this embodiment, the timing recovery devices 300 and 302, the phase comparator 304, the clock device 306, the line delay devices (308, 310, and 312), and the pixel delay devices (314, 316, 318, 320, 322, 324, 326, 328, and 330) are similar in operation to those previously discussed.

In this sample embodiment, peak detector 334 senses the peak values of the output signal of the combination circuit 332. If the peaks of the processed signal or "detail" information exceed a preset limit, the peak detector 334 provides a signal to the combination circuit 332 which reduces the overall gain of the combination circuit 332. This feature of the embodiment shown in FIG. 3 further increases the versatility of the present invention by automatically adjusting the gain of the combination circuit 332 to a desired level. Automatic gain adjustment may be useful when, for example, contrast values suddenly change in a video image. Thus, this feature permits the degree of detail enhancement of different areas of the same image to be independently optimized.

Other aspects of the present invention such as the timing reproduction device, the blanking addition circuit, clipping circuit, the sync addition circuit, and the background combination circuit are not explicitly shown in FIG. 3, and may be, for example, like those shown in FIG. 1.

The foregoing embodiments are illustrative only, and may be modified and varied in many ways to take advantage of the innovative concepts provided by the present invention. For example, the present invention is not only applicable both to interlaced and non-interlaced scanning formats, but is also applicable to formats, such as those proposed for high-definition television, wherein the pixels of an image are encoded into multiple serial data streams which may be transmitted separately. In general, the concepts of the present invention provide a very economical way to implement two-dimensional image processing algorithms without need for a high-speed random-access memory, and the present invention can therefore be applied to a wide variety of applications where that is needed.

For example, the devices referred to as "line delay devices" and "pixel delay devices" do not have to have delay times corresponding exactly to one line of delay or one pixel of delay in the chosen video format. In some cases, depending on the set of pixel values which is desired to be manipulated, it may alternatively be preferable to implement multiples of a line delay in one or more of the "line delay devices," or multiple pixels of delay in one or more of the "pixel delay devices." Similarly, it is not necessary to have the delays connected in serial fashion, as in the principal embodiments shown; alternatively, several delay devices having different respective delay times (e.g. one line, two lines, and three lines) could be connected in parallel to the input signal.

For example, the present invention is particularly advantageous in video monitors and television receivers which may be used to observe video signals provided by playback from a video cassette recorder (VCR). In this case, as noted above, variation in synchronization timing is quite likely. Substantial image degradation (as compared to broadcast standards) commonly occurs in VCR recording and playback, so that it would be highly desirable to be able to use image-processing techniques to restore or enhance the quality of degraded signals. Moreover, this market is generally quite cost-sensitive, so that the economical implementations permitted by the present invention are highly advantageous.

Another advantageous area of application is in combination with low-cost and light-weight video cameras. This rapidly expanding market is also quite cost-sensitive, and the economical video enhancement implementations enabled by the present invention can permit advantageous compensation for the limitations of equipment and operator skill.

Another advantageous area of application is in systems using video cameras which are unattended (e.g. for surveillance or for robotics applications). Unattended operation will frequently mean that lighting is far from optimal, and the economical image-processing capabilities permitted by the present invention may permit substantial enhancement of recognition capabilities in such environments.

Thus, while the foregoing embodiments have provided sample representations of the present invention, the full extent of the present invention is defined only by the claims.

What is claimed is:

1. A method for processing a video signal containing pixel values and synchronization information, comprising the steps of:
   (a) passing said video signal through at least one signal delay device to produce a plurality of signals which are indicative of a set of pixels which possess a desired spatial relationship, said spatial relationship determined at least in part by the amount of delay introduced by said signal delay device;
   (b) combining said plurality of signals to produce a modified version of said video signal; and
   (c) repeatedly monitoring and adjusting the amount of delay produced by said delay device to cause said spatial relationship to remain essentially constant.

2. A method for processing a video signal containing pixel values and synchronization information, comprising the steps of:
   (a) providing the video signal as input into first and second signal channels;
   (b) performing processing operations, in said first signal channel, which include:
      (1) sensing the synchronization information of the video signal;
      (2) passing the video signal through a signal delay device operable to delay said video signal by an amount so as to provide a delayed video signal;
      (3) sensing the synchronization information of said delayed signal;
      (4) comparing the phase of the synchronization information of the video signal with the phase of the synchronization information of said delayed video signal, and generating an error signal indicative of the amount of phase difference detected;
      (5) utilitizing said error signal to control the amount of delay of said signal delay device to cause said phase difference to become precisely equal to a predetermined amount; and
      (6) performing signal processing operations on said video signal to provide a modified video signal wherein at least some pixel values of said video signal are modified with reference to other pixel values of said video signal as provided by said delayed video signal; and
   (c) performing processing operations in said second channel, which include processing said video signal to provide a reduced contrast video signal; and
   (d) combining said modified video signal and said reduced contrast video signal to create an enhanced video signal.

3. A method for processing a video signal containing pixel values and synchronization information, comprising the steps of:
   (a) sensing the synchronization information of the video signal;
   (b) passing the video signal through a signal delay device having a delay time so as to provide an output signal;
   (c) sensing the synchronization information of the output signal;
   (d) comparing the phase of the synchronization information of the video signal with the phase of the synchronization information of the output signal, and generating an error signal indicative of the amount of phase difference detected; and
   (e) controlling the delay time of said signal delay device, in accordance with said error signal, to cause said phase difference to tend towards a precisely predetermined amount.

4. A system for video signal processing, comprising:
   (a) a signal delay device which receives an input video signal containing pixel values and introduces an amount of delay time to produce a delayed video signal corresponding to said input video signal;
   (b) a compensation circuit receiving said input video signal and said delayed video signal which adjusts said delay time of said delay device to cause pixels in said delayed video signal to be in precise vertical alignment with corresponding pixels in said input video signal; and
   (c) analog logic connected to modify pixel values in said video signal with reference to information including corresponding pixel values in said delayed video signal.

5. A system for video signal processing, comprising:
   (a) a signal delay device which receives an input video signal and introduces an amount of delay time to produce a delayed video signal corresponding to said input video signal;
   (b) a compensation circuit which adjusts said delay time of said signal delay device to cause pixels in said delayed video signal to be in precise vertical alignment with corresponding pixels in said input video signal;
   (c) analog logic connected to modify pixel values in said input video signal with reference to information including corresponding pixel values in said delayed video signal to provide a modified video signal;
   (d) means for processing said input video signal to produce a reduced contrast version of the input video signal; and
   (e) a combining circuit which combines said reduced contrast version of the input video signal and said modified video signal to produce an enhanced video output signal.

6. A system for video signal processing comprising:
   (a) a charge transfer device (CTD) signal delay device which receives an input video signal containing a synchronization signal and produces an output signal which is a time delayed version of the input video signal;
   (b) a phase comparator which compares the phase of the synchronization signal of the input video signal with the phase of the synchronization signal of said output signal, and which produces an error signal indicative of a phase difference therebetween; and
   (c) a clock pulse generator coupled with said phase comparator which produces clock pulses with characteristics responsive to characteristics of said error signal,
   said clock pulse generator being coupled with said CTD signal delay device, said CTD signal delay device providing an amount of delay dependent on said characteristics of said clock pulses so as to cause said phase difference to be precisely a predetermined amount.

7. The system of claim 6, wherein said clock pulse generator produces said clock pulses at a rate dependent on characteristics of said error signal, and wherein said CTD signal delay device provides said delay dependent on the rate of said clock pulses.

8. The system of claim 6, wherein said clock pulse generator adjusts the amount of said delay introduced by said CTD signal delay device so as to cause said phase difference to be precisely zero.

9. The system of claim 6, further comprising a timing recovery circuit for removing the synchronization signal from the input video signal.

10. The system of claim 6, wherein said CTD signal delay device comprises a delay element which produces a one line delay in accordance with a predetermined video standard.

11. The system of claim 6, wherein said CTD signal delay device comprises a delay element which produces a two line delay in accordance with a predetermined video standard.

12. The system of claim 6, wherein said CTD signal delay device further comprises at least one pixel delay element which produces a one-pixel delay in accordance with a predetermined video standard.

13. The system of claim 12, wherein said at least one pixel delay element comprises an inductance-capacitance pixel delay element.

14. The system of claim 6,
   wherein said CTD signal delay device comprises a at least one line-delay element which produces a one line delay in accordance with a predetermined video standard,
   and further comprising at least one pixel delay element which produces a one-pixel delay in accordance with said predetermined video standard.
   wherein said at least one line-delay element and said at least one pixel delay element are configured so as to produce a two-dimensional grid of three vertical pixels by three horizontal pixels.

15. The system of claim 14, wherein said at least one line-delay element comprises at least two line delay elements and wherein said at least one pixel delay element comprises at least six pixel delay elements.

16. The system of claim 4, wherein said analog logic comprises a summing amplifier for weighting and combining the pixel values.

17. The system of claim 6, further comprising means for processing said input video signal to produce a reduced-contrast version of said input video signal, means for processing said input video signal to produce a detail information video signal, and a background combining circuit which combines said reduced-contrast version of said input video signal with said detailed information video signal to produce an enhanced version of the input video signal.

18. The system of claim 17, further comprising a synchronization information addition circuit operable to reintroduce synchronization information to said enhanced version of the input video signal.

19. The system of claim 4, wherein said signal delay device comprises a CTD line delay.

20. The system of claim 4, wherein said signal delay device comprises a charge coupled device (CCD) line delay.

21. The system of claim 5, Wherein said compensation circuit comprises a timing recovery circuit, a phase comparator circuit, and a clock circuit.

22. The method of claim 3, wherein said (a) and said (b) step employ a one-shot method.

23. The method of claim 3, wherein said signal delay device comprises a CTD line delay.

24. The method of claim 3, wherein said (d) step employs a phase comparator method.

25. The method of claim 3, wherein said (e) step employs the step of producing clock pulses of a variable rate from said error signal and controlling said delay time in accordance with variation of the rate of said clock pulses.

* * * * *